United States Patent
Hong et al.

(10) Patent No.: US 10,021,034 B2
(45) Date of Patent: Jul. 10, 2018

(54) APPLICATION AWARE MULTIHOMING FOR DATA TRAFFIC ACCELERATION IN DATA COMMUNICATIONS NETWORKS

(71) Applicant: Hughes Network Systems, LLC, Germantown, MD (US)

(72) Inventors: Se Gi Hong, Gaithersburg, MD (US); Chi-Jiun Su, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 25 days.

(21) Appl. No.: 14/866,839

(22) Filed: Sep. 25, 2015

(65) Prior Publication Data

US 2016/0094467 A1 Mar. 31, 2016

Related U.S. Application Data

(60) Provisional application No. 62/055,632, filed on Sep. 25, 2014.

(51) Int. Cl.
*H04L 12/801* (2013.01)
*H04L 12/707* (2013.01)
*H04L 12/851* (2013.01)

(52) U.S. Cl.
CPC ............ *H04L 47/35* (2013.01); *H04L 45/24* (2013.01); *H04L 47/2441* (2013.01)

(58) Field of Classification Search
CPC ...... H04L 45/24; H04L 47/35; H04L 47/2441
See application file for complete search history.

(56) References Cited

U.S. PATENT DOCUMENTS

| | | |
|---|---|---|
| 6,775,235 B2 | 8/2004 | Datta et al. |
| 7,406,048 B2 | 7/2008 | Datta et al. |
| 7,584,500 B2 | 9/2009 | Dillon et al. |
| 8,510,409 B1 | 8/2013 | Harris et al. |
| 2006/0182034 A1 | 8/2006 | Klinker et al. |
| 2012/0163180 A1 | 6/2012 | Goel |

(Continued)

OTHER PUBLICATIONS

U.S. Patent Office, "International Search Report & Written Opinion", PCT Application No. PCT/US2015/052508, dated Jan. 4, 2016.

(Continued)

*Primary Examiner* — Lakeram Jangbahadur
(74) *Attorney, Agent, or Firm* — Potomac Technology Law, LLC

(57) ABSTRACT

A method for application aware multihoming with multipath tunneling protocols is provided. A message client data packet is classified based an application from which the data packet originated. The header structure of the data packet is modified to generate a proxy data packet comprising the client data payload and a proxy header structure. The proxy header structure comprises source-client and destination-server parameters and an identifier of a client-proxy device, protocol parameters indicating a source protocol sequencing of the message client data packet, and protocol parameters including source parameters of the client-proxy device and destination parameters of a server-proxy device. A network communications link is selected for transmission of the proxy data packet to the server-proxy device, where the selection is based on the classification of the message client data packet. The proxy data packet is transmitted to the server-proxy device via the network communications link.

6 Claims, 8 Drawing Sheets

(56) References Cited

U.S. PATENT DOCUMENTS

| | | | | |
|---|---|---|---|---|
| 2012/0257527 A1* | 10/2012 | Jorgensen | ............... | H04L 1/20 370/252 |
| 2013/0322451 A1* | 12/2013 | Wang | ................... | H04L 45/306 370/392 |
| 2014/0032690 A1* | 1/2014 | Ramarao | ................ | G06F 9/546 709/206 |

OTHER PUBLICATIONS

Allman, et al., "Enhancing TCP Over Satellite Channels using Standard Mechanisms", IETF, RFC: 2488, Jan. 1999.

Border, et al., "Performance Enhancing Proxies Intended to Mitigate Link-Related Degradations", IETF, RFC: 3135, Jun. 2001.

Dillon, "Asymmetric Internet Access Over SatelliteTerretrial Networks", AIAA, 16th International Communications Satellite Systems Conference, AIAA-96-1044-CP, Feb. 25, 1996, 476-482.

Ford, et al., "TCP Extensions for Multipath Operation with Multiple Addresses", IETF, RFC: 6824, Jan. 2013.

Raiciu, et al., "How Hard Can It Be? Designing and Implementing a Deployable Multipath TCP", http://inl.info.ucl.ac.be/system/files/nsdi12-final125.pdf, Mar. 15, 2012.

Roy-Chowdhury, et al., "Security Issues in Hybrid Networkswith a Satellite Component", IEEE Wireless Communications, Dec. 2005, 50-61.

Scharf, et al., "Multi-Connection TCP (MCTCP) Transport draft-scharf-mptcp-mctcp-00", IETF, Internal Draft—Experimental, Jul. 1, 2010.

Singh, et al., "PayLoad Multi-connection Transport using Multiple Addresses draft-singh-mptcp-plmt-00.txt", IETF, Internal Draft—Experimental, Aug. 6, 2010.

Stark, et al., "The Case for Prefetching and Prevalidating TLS Server Certificates", http://crypto.stanford.edu/~dabo/pubs/papers/ssl-prefetch.pdf, 2011.

\* cited by examiner

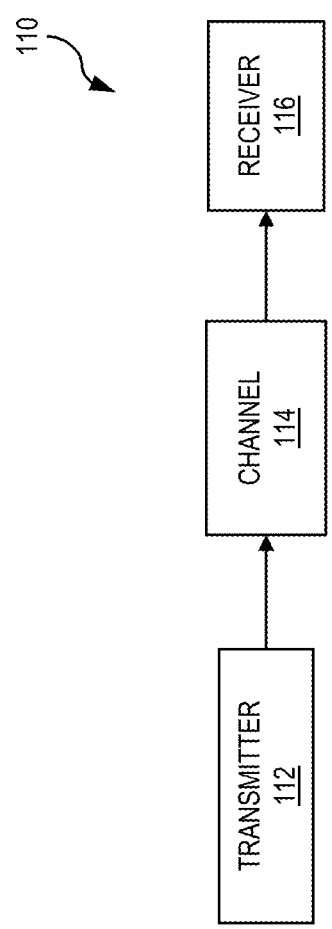

APPLICATION AWARE MULTIHOMING FOR DATA TRAFFIC ACCELERATION IN DATA COMMUNICATIONS NETWORKS

RELATED APPLICATIONS

This application claims the benefit of the earlier filing date under 35 U.S.C. § 119(e) from U.S. Provisional Application Ser. No. 62/055,632 (filed 2014-09-25), which is hereby incorporated by reference herein in its entirety.

BACKGROUND

Transmission control protocol (TCP) is the dominant protocol in use today on the Internet. TCP is carried by Internet protocol (IP) and is used in a variety of applications including reliable file transfer and Internet web browser applications. The Secure Sockets Layer (SSL) and the Transport Layer Security (TLS) are cryptographic protocols designed to provide communications security over public networks, such as the Internet. The SSL protocol is the dominant protocol for secure network communications, such as secure communications over the Internet. The main function of the SSL protocol is to provide privacy, security and reliability between two communicating applications. Privacy and security are provided through connection encryption and identity authentication based on certificates, while reliability is provided via dependable maintenance of a secure connection through message integrity checking. As such, the SSL protocol involves intensive messaging to set up and maintain the connection or session.

The Internet Engineering Task Force (IETF) created the TLS protocol in an attempt to standardize SSL within the Internet community. The TLS protocol was designed to facilitate client/server applications to securely communicate in a way to prevent eavesdropping, tampering or message forgery. Similar to SSL, the TLS protocol requires the initial setup of a TLS connection or session between the client and server. More specifically, once the client and server have agreed to use TLS, they negotiate a stateful connection by using a handshaking procedure, during which the client and server agree on various parameters used to establish the connection's security. Accordingly, as with SSL, the TLS protocol involves intensive messaging and handshaking to set up and maintain the connection or session.

The Hypertext Transfer Protocol (HTTP) is an application layer protocol for distributed, collaborative, hypermedia information sessions, which serves as the foundation for application layer data communications over the Internet. Hypertext is structured text that uses logical links (hyperlinks) between nodes containing, and HTTP serves as the protocol to exchange or transfer hypertext. Hypertext Transfer Protocol Secure (HTTPS) is the communications protocol for secure communication using the HTTP protocol. HTTPS consists of the layering of HTTP on top of the SSL/TLS protocol, thereby adding the security capabilities of SSL/TLS to standard HTTP communications. The security of HTTPS thus consists of that of the underlying TLS, which uses long-term public and secret keys to exchange a short term session key to encrypt the data flow between client and server. In view of the intensive setup, maintenance and key messaging of the TCP, SSL/TLS and HTTP/HTTPS protocols, these protocols can suffer from significant performance degradation in a high latency network (e.g., a long fat network (LFN), such as a satellite network). For example, in an LFN, TCP throughput degrades because of TCP congestion control, SSL/TLS suffers from high session setup delay, and HTTP has high idle time between a request and a response.

A typical LFN is the satellite network, which provides high link capacity, but exhibits large messaging latency because of the long travel of signals between a ground terminal and a satellite orbit (e.g., a geostationary orbit). As a result of the long distance from a ground terminal to a satellite in a geostationary orbit, a typical geosynchronous satellite network has a high propagation delay between a user terminal (e.g., Very Small Aperture Terminal (VSAT)) and the central satellite gateway (e.g., about 240-270 ms propagation delay for a one way trip to/from the satellite). Thus a typical round trip time (RTT) for such a network is upwards of 480-540 ms. Further, upstream channels of a satellite system are shared by many VSATs, and thus suffer from access contention. To resolve network contention of upstream medium among VSATs and enhance quality-of-service, Bandwidth-on-Demand (BoD) algorithms are typically employed for network resource allocation in satellite networks. When a VSAT unit receives packets from a client, it provides a corresponding bandwidth request from a network control center (NOC) or gateway, and the NOC responds with an allocation of channel slots to fulfill the bandwidth request. The negotiation back and forth between the VSAT and the NOC thereby add additional RTTs to the communications process. Thus, it takes at least three propagation delays (720-810 ms) to send a packet from VSAT to the gateway.

To overcome TCP throughput degradation in LFNs, performance-enhancing proxies (PEP) were developed and have been in use for over a decade now. See, e.g., J. Border et al., "Performance Enhancing Proxies Intended to Mitigate Link-Related Degradations," IETF RFC 3135, June 2001. In some broadband satellite networks, PEP may be the core network function. In satellite networks, PEP proxies may be located at both the satellite gateway and user terminal remote sites, allowing for TCP senders to quickly fill up the high capacity link. The transport layer PEP (e.g., TCP PEP), for example, in the gateway spoofs acknowledgment messaging (ACKs) to reduce waiting time for ACKs at the sender, and uses large window size to fill up the link. Further, HTTP is based on a request and response process (e.g., a web page request and web page content response). With a high propagation delay link (e.g., a satellite link), the request-response process causes large delays in web page loading. To resolve such latency issues in LFNs, HTTP prefetching mechanisms have long been employed. For example, before the web browser even requests the embedded objects of a website, an HTTP proxy server in the gateway anticipates such requests by parsing the HTML pages, prefetching the embedded objects, and pushes them to an HTTP proxy client at the user satellite terminal. By serving the cached objects at the satellite terminal, the response time is reduced. Even though an LFN works relatively well with web browsing using TCP PEP and HTTP prefetching, latency issues still exist when accessing secure websites. Most secure websites (e.g., ecommerce websites and web email sites provide channel security by using HTTP over SSL/TLS (HTTPS). With HTTPS, because the web contents are encrypted, the HTTP proxy server cannot read and parse the encrypted web contents. Thus, the HTTP prefetching mechanism cannot be used for secure websites. In addition, SSL/TLS introduces additional delay for the session setup. Full SSL/TLS session setup requires two round-trip times (RTTs), which introduce significant latency and other issues in LFNs.

Other approaches have been developed to resolve the performance degradation of SSL traffic over satellite networks. Pursuant to one such approach (SSL Bridging—see, e.g., U.S. Pat. No. 7,584,500) proxy servers operate as a distributed HTTP proxy servers with HTTPS capabilities, whereby the proxy servers maintain SSL protection of communications between the browser and the server, and pre-fetch secure documents via rewritten secure content requests. More specifically, SSL Bridging is based on the split of one end-to-end SSL session into three sessions: one session between a client and a proxy at VSAT, another session between a proxy at VSAT and a proxy at satellite IP gateway, and the last session between a proxy at the IP gateway and a web server. Since a proxy at the gateway creates a SSL session to a web server, it can decrypt the web objects and parse the HTML file, and can thus perform HTTP prefetching at the gateway. Using this approach, however, third-parties (e.g., satellite Internet service providers) have access to the secure data, and thus SSL bridging is not an acceptable approach for providing end-to-end security.

Another approach (Dual-Mode SSL or DSSL—see, e.g., A. Roy-Chowdhury et al., "Security Issues in Hybrid Networks with a Satellite Component," IEEE Wireless Communications, December 2005) is based on dual-mode encryption of web pages. Pursuant to this approach, the secure connection has two modes—an end-to-end main mode connection between the client and the web server, and a secondary mode connection that has the hub HTTP proxy as an intermediate node. A client and a web server have two keys (K1 and K2) for encryption, but the proxies at the user terminal and the gateway have only one key (K2). The key K1 is used to encrypt the whole web page and the key K2 is used to encrypt the embedded object links of the page. Thus, web servers need to insert two data elements: object links and web page. The proxy at the gateway can parse the object links using the key K2, so it can pre-request the objects. Accordingly, however, the DSSL approach is more complex in comparison to SSL in that it requires the creation of an additional connection and thus involves additional overhead in establishing and maintaining that connection. Further, web servers parse the HTML file and parse object links and the third-party (e.g., the proxy at the gateway) can read the object links, and thus DSSL similarly cannot provide full end-to-end security.

Pursuant to a further approach (Multipath TCP or MPTCP—see, e.g., Ford et al., "TCP Extensions for Multipath Operation with Multiple Addresses, IETF RFC-6824, January 2013), a single TCP streaming session is provided over multiple paths or links (as used herein, the terms "path" or "paths" and "link" or "links" are used interchangeably). More specifically, a Multipath TCP connection provides a bidirectional byte-stream between two hosts communicating like normal TCP, while enabling the hosts to use different paths with different IP addresses to exchange packets belonging to the MPTCP connection. At the network layer, each MPTCP sub-flow looks like a regular TCP flow whose segments carry a new TCP option type, whereby a new TCP option is used for connection ID, sequence numbers and ACK numbers of sub-flows. MPTCP provides a benefit in reliability and higher throughput, however, it may present compatibility issues with middle-boxes or proxies. Such middle-boxes may rewrite TCP headers and drop unknown TCP options (See, e.g., Raiciu et al., "How Hard Can it Be? Designing and Implementing a Deployable Multipath TCP," Proceedings of NSDI, San Jose, Calif., April 2012). For example, PEP terminates TCP connections, and thus MPTCP would not be compatible with PEP proxies. Even though PEP forwards the MPTCP option, if the PEP proxy does not implement the MPTCP functionality (e.g., does not provide for MPTCP Data ACKs), the connection will be broken.

Multi-Connection TCP (MCTCP—see, e.g., Scharf, "Multi-Connection TCP (MCTCP) Transport, IETF Internet-draft, July-2010) and Payload Multi-Connection Transport (PLMT—see, e.g., Singh et al, Payload Multi-Connection Transport Using Multiple Addresses," IETF Internet-draft, August 2010) provide other versions of MPTCP, whereby, instead of TCP option, they use a shim layer (between the transport layer and the application layer) to insert multipath flow information. MCTCP, however, also uses the TCP option for TCP handshakes to create the multipath connections, and thus presents the same potential incompatibility issues with middleboxes. Further, both MCTCP and PLMT require additional connections for multi-connection modes, which increase overhead for the setup and maintenance of such additional connections. The additional connections are critical in LFNs, especially in satellite networks whose RTT can be more than 700 ms. Because of these additional connections for each flow, they are not useful for short TCP flows.

Hybrid satellite-terrestrial networks have also been developed (See, e.g., Arora et al., "Asymmetric Internet Access Over Satellite-Terrestrial Networks," Proceedings of the AIAA International Communications Satellite Systems Conference, February 1996). Pursuant to such a hybrid network, a hybrid terminal provides two network interfaces, with one being for connection to a receive-only satellite terminal and the other being for an outgoing connection to a terrestrial modem. This hybrid approach delivers all upload or inroute traffic through the modem/terrestrial network and receives all download or outroute traffic through the satellite network. Because of the fixed paths for each direction, however, this system presents performance issue and large data usage of terrestrial networks. For example, some session setup messages (such as SSL server hello messages) are delivered through the satellite network resulting in longer session setup delays. Further, the terrestrial network suffers from large data usage (at a corresponding high expense) with large upload files. Additionally, the hybrid system uses IP tunneling, which is incompatible with splitting a flow into two paths (e.g., a sequence number and ACK number hole issue arises with such split flows).

What is needed, therefore, are approaches for application aware multihoming with multipath tunneling protocols to address network protocol performance and data throughput degradation in long fat networks (LFNs), and particularly in the case of secure network protocols and data throughput over secure network sessions.

SOME EXAMPLE EMBODIMENTS

Embodiments of the present invention advantageously address the foregoing requirements and needs, as well as others, by providing approaches for application aware multihoming with multipath tunneling protocols to address network protocol performance and data throughput degradation in long fat networks (LFNs—e.g., relatively long delay satellite networks, such as geosynchronous satellite networks), and particularly in the case of secure network protocols and data throughput over secure network sessions. In accordance with example embodiments, this approach comprises a new multihoming system that provides an auxiliary low-latency network (LLN—such as a terrestrial cellular network) path in parallel with the LFN paths, which selectively routes data traffic via the LLN and LFN paths to improve network protocol performance and data throughput, (e.g., in secure web browsing, such as HTTPS) and to facilitate control of data usage over the respective networks.

In accordance with example embodiments a method for application aware multihoming with multipath tunneling protocols is provided. A client-proxy device located at a client node of a data communications network receives a first client data packet of a source client data flow originating from a source-client device, wherein the first client data packet comprises a client data payload and a client header structure based on one or more data communications protocols. A message classification for the first client data packet is determined based on one or more application-based parameters associated with an application from which the first client data packet originated. The client header structure of the first client data packet is modified to generate a client-proxy data packet comprising the client data payload and a client-proxy header structure, wherein the client-proxy header structure comprises flow information including source-client and destination-server parameters and an identifier of the client-proxy device, one or more protocol parameters of the client header structure indicating at least a source protocol sequencing of the first client data packet, and parameters of a first proxy data communications protocol including at least one source parameter of the client-proxy device and at least one destination parameter of a server-proxy device located at a server or gateway node of the data communications network. A first one of a plurality of network communications links is selected for transmission of the client-proxy data packet to the server-proxy device, wherein the selection is based on the determined message classification of the first client data packet. The client-proxy data packet is transmitted to the server-proxy device via the first network communications link, wherein the first proxy data communications protocol is configured for the transmission of the client-proxy data packet to the server-proxy device via a respective protocol connection over the first network communications link.

According to a further embodiment, the server-proxy device receives the client-proxy data packet. A client flow record is recorded in a flow information table for the source client data flow, wherein the client flow record includes the source client and destination-server parameters from the flow information of the client-proxy header structure, the client-proxy device identifier, and a server-proxy device source identifier specific to the flow record. The client-proxy header structure of the client-proxy data packet is modified to generate a second client data packet comprising the client data payload and a client-server header structure, wherein the client-server header structure comprises server-proxy transmission protocol parameters including the destination-server parameters from the flow information of the client-proxy header structure, a source address parameter of the server-proxy device, and the server-proxy device source identifier. The second client data packet is transmitted to a destination-server device.

According to a further embodiment, the destination-server device receives the second client data packet. A first server data packet is generated comprising a server data payload that relates to the first client data packet and a server header structure based on the one or more data communications protocols, wherein the server header structure comprises server communications protocol parameters including a source address parameter of the destination-server device, the source address parameter of the server-proxy device, and the server-proxy device source identifier. The first server data packet is transmitted to the server-proxy device.

According to a further embodiment, the server-proxy device receives the first server data packet. A message classification for the first server data packet is determined based on one or more application-based parameters associated with an application from which the first server data packet originated. The client flow record is acquired from the flow information table by looking up the record based on the server-proxy device source identifier included in the server header structure of the first server data packet. The server header structure of the first server data packet is modified to generate a server-proxy data packet comprising the server data payload and a server-proxy header structure, wherein the server-proxy header structure comprises information from the client flow record including the source-client and destination-server parameters, one or more protocol parameters of the server header structure indicating at least a source protocol sequencing of the first server data packet, and parameters of a second proxy data communications protocol including at least one source parameter of the server-proxy device and at least one destination parameter of the client-proxy device. A second one of the plurality of network communications links is selected for transmission of the server-proxy data packet to the client-proxy device, wherein the selection is based on the determined message classification of the first server data packet. The server-proxy data packet is transmitted to the client-proxy device via the second network communications link, wherein the second proxy data communications protocol is configured for the transmission of the server-proxy data packet to the client-proxy device via a respective protocol connection over the second network communications link.

According to a further embodiment, the client-proxy device receives the server-proxy data packet. The server-proxy header structure of the server-proxy data packet is modified to generate a second server data packet comprising the server data payload and a server-client header structure, wherein the server-client header structure comprises the protocol parameters of the server header structure indicating at least the source protocol sequencing of the first server data packet, and client communications protocol parameters including the source address parameter of the destination-server device and a destination address parameter of the source-client device. The second server data packet is transmitted to the source-client device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements, and in which:

FIGS. 1A, 1B, 1C illustrate communications systems for employing application aware multihoming with multipath tunneling protocols, in accordance with example embodiments of the present invention;

DETAILED DESCRIPTION

Approaches for application aware multihoming with multipath tunneling protocols to address network protocol performance and data throughput degradation in long fat networks (LFNs), and particularly in the case of secure network protocols and data throughput over secure network sessions, are provided. In accordance with example embodiments, such an approach comprises a new multihoming system that provides an auxiliary low-latency network (LLN—such as a terrestrial cellular network) path in parallel with the LFN paths, which selectively routes data traffic via the LLN and LFN paths to improve network protocol performance and data throughput, (e.g., in secure web browsing, such as HTTPS) and to facilitate control of data usage over the respective networks. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Further, as will be appreciated, a module or component (as referred to herein) may be composed of software component(s), which are stored in a memory or other computer readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

Figure 1B:
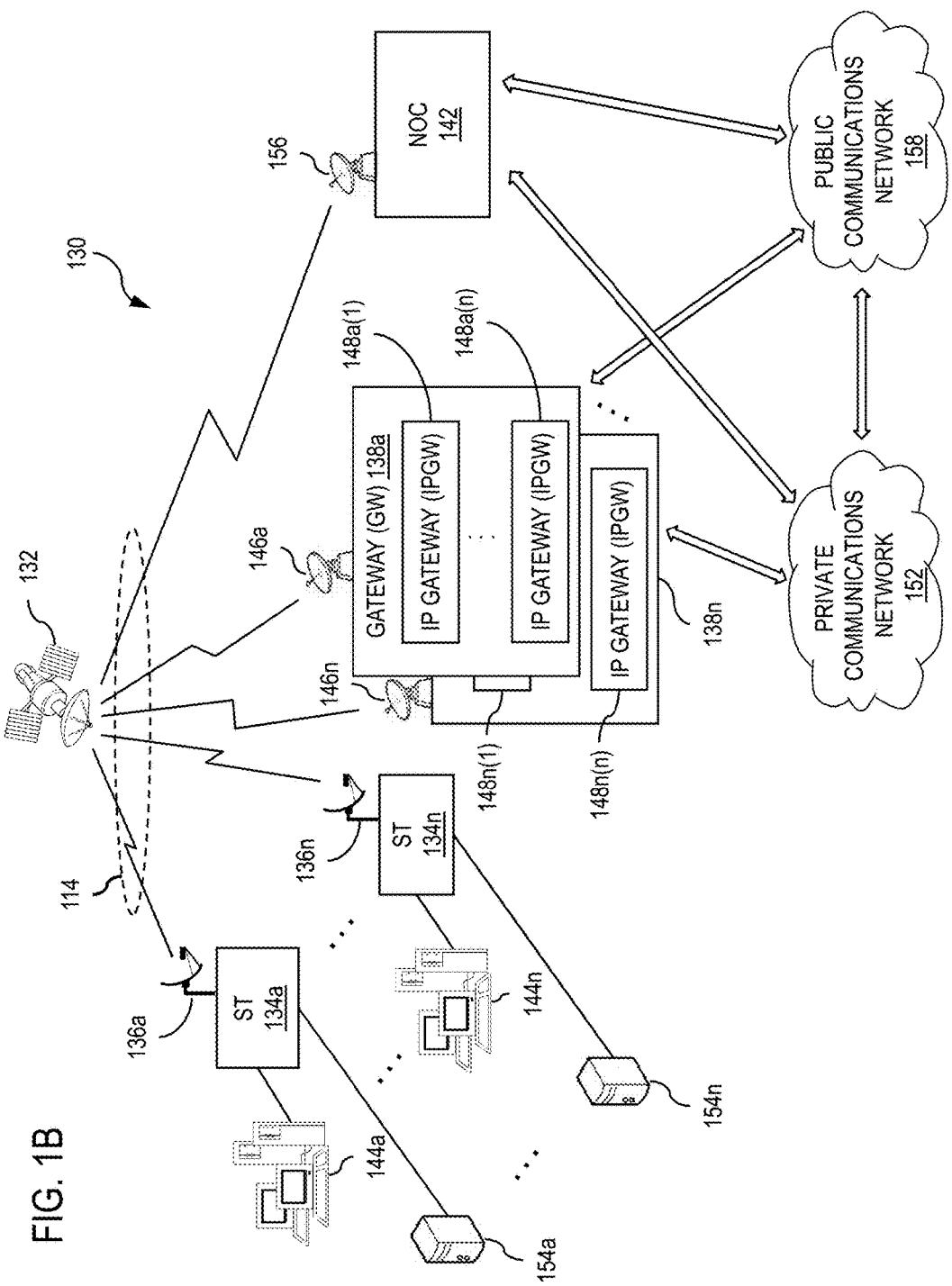
Figure 1C:
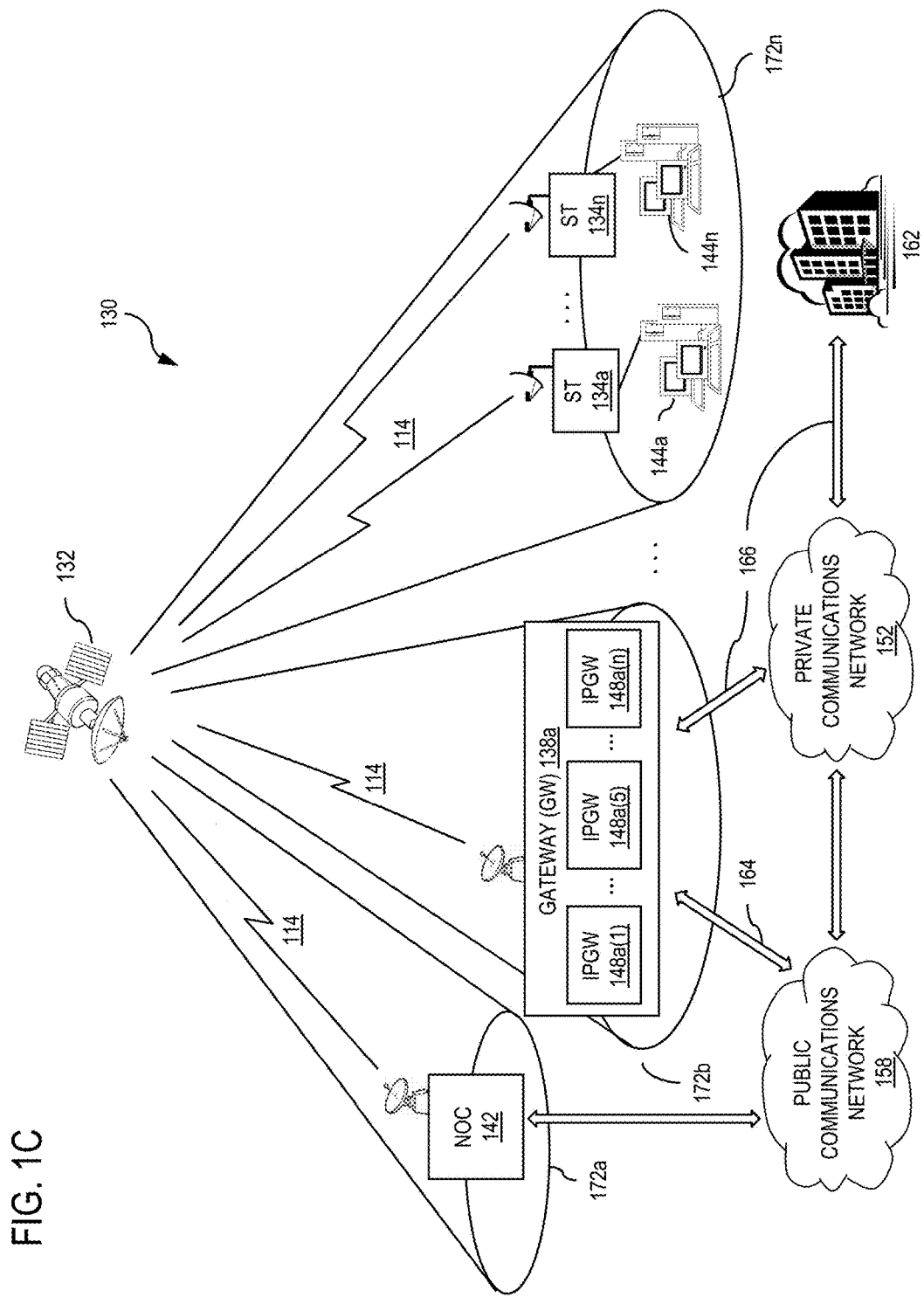

FIGS. 1A, 1B, 1C illustrate communications systems for employing approaches for addressing network protocol performance and data throughput degradation in long fat networks (LFNs), in accordance with example embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

FIG. 1B illustrates an example satellite communications system 130, according to example embodiments. Satellite communications system 130 includes a satellite 132 that supports communications among multiple satellite terminals (STs) 134a 134n, a number of gateways (GWs) 138a 138n, and a network operations center (NOC) 142. The STs, GWs and NOC transmit and receive signals via the antennas 136a 136n, 146a 146n, and 156, respectively. According to different embodiments, the NOC 142 may reside at a separate site reachable via a separate satellite channel or may reside within a GW site. The NOC 142 performs the management plane functions of the system 130, while the GWs 138a 138n perform the data plane functions of the system 130. For example, the NOC 142 performs such functions as network management and configuration, software downloads (e.g., to the STs 134a 134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the message classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a 138n include one or more IP gateways (IPGWs)—whereby the data plane functions are divided between a GW and its respective IPGWs. For example, GW 138a includes IPGWs 148a(1) 148a(n) and GW 138n includes IPGWs 148n(1) 148n(n). A GW may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), HTTP proxy functions, quality of service functions (e.g., classification, prioritization, differentiation, random early detection (RED), TCP/UDP flow control), bandwidth usage policing, dynamic load balancing, and routing. Accordingly, the TCP PEP and HTTP proxies are located at the satellite gateway. Further, a GW and respective IPGW may be collocated with the NOC 142. The STs 134a 134n provide connectivity to one or more hosts 144a 144n and/or routers 154a 154n, respectively. The Satellite communications system 130 may operate as a bent pipe system, where the satellite essentially operates as a repeater or bent pipe. Alternatively, the system 130 may employ a switching or processing satellite supporting mesh communications (point to point communications directly between, for example, the two STs 134a and 134n).

In a bent pipe system of an example embodiment, the satellite 132 operates as a repeater or bent pipe, and communications to and from the STs 134a 134n are transmitted over the satellite 132 to and from respective IPGWs associated with particular STs. Further, in a spot beam system, any one spot beam operates as a bent pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1) 148a(5)—where the pool of IPGWs is a suitable subset of the IPGWs 148a(1) 148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(5)). The IPGW 148a(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a 134n)—where STs 134a 134n are correspondingly associated with the two IPGWs 148a(1) and 148a(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(5). The IPGWs determine that the communication is destined for the remote STs 134a 134n, and package the data as a multicast communication addressed to the community of STs 134a 134n. The IPGWs then transmit the data communication, via the satellite 132, for decoding by the community of STs 134a 134n. Accordingly, the satellite of such a system acts as a bent pipe or repeater, transmitting communications between the STs 134a 134n and their respective associated IPGWs 148a 148n.

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(5)—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(5)). The IPGW 148a(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a-134n)—where STs 134a-134n are correspondingly associated with the two IPGWs 148a(1) and 148a(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(5). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite of such a system acts as a bent pipe or repeater, transmitting communications between the STs 134a-134n and their respective associated IPGWs 148a-148n.

In accordance with example embodiments of the present invention, an auxiliary, relatively low latency network (LLN) path is provided in parallel with one or more high latency paths of an LFN (e.g., channels of a satellite network). This architecture, for example, facilitates improved performance of protocol session or link setup and maintenance, and improves data throughput (e.g., resulting in a reduction in page load time (PLT) for web pages over secure connections, such as HTTPS and SSL/TLS protocol connections). With the addition of an auxiliary LLN path, latency of HTTPS traffic can be reduced while also taking advantage of the large link capacity of the LFN paths. According to one embodiment, application-aware message classification is applied for classification of messages and data, and then only certain messages and data (based on the classification) utilize the low latency path, which provides for efficient usage of bandwidth over the LLN path. By way of example, the LLN may be utilized to deliver latency-sensitive application messages that present a higher or more significant impact on application performance (e.g., interactive, small messages such as DNS lookup, TCP handshake, SSL session setup, and HTTP GET messages), while the LFN would be utilized to deliver large and less latency-sensitive application messages that present a lower or less significant impact on application performance (e.g., HTTP response messages—web server data). In other words, smart message classification (e.g., applied at the application layer) provides for efficient distribution of data messaging between the LLN paths and the LFN paths (e.g., forwarding small request messages, such as HTTP request over SSL/TLS, via an LLN path, and forwarding large response messages, such as HTTP response over SSL/TLS, via an LFN path). Such application-aware network multihoming approaches of example embodiments thereby reduce the idle time between request and response HTTPS messaging, while making efficient usage of a relatively small amount of bandwidth of the low latency network. Further, by forwarding small, interactive messages (e.g., TCP handshake and SSL/TLS session setup messages) through LLN paths, the application-aware network multihoming approaches of example embodiments thereby reduce session setup and connection time. Example embodiments of such message classification approaches are described in further detail below with reference to FIG. 5.

According to example embodiments, low latency network paths may comprise any of various types of networks that provide for a relatively lower round trip time (RTT) as compared to an LFN, such as a geosynchronous satellite network. By way of example, LLN paths may be provided via various wire-line networks (e.g., dial-up/telephony, DSL, cable, fiber, etc.) and wireless networks (e.g., cellular networks, such as 3G/4G networks, line-of-site networks, and wireless networks employing airborne platforms, such as high altitude platforms, drones, and low orbit satellites). For example, in the case of a 3G/4G cellular network, a large percentage of existing users/subscribers will already have subscriptions to 3G/4G cellular data plans (e.g., smart-phone data plans). Further, 3G/4G Internet services may also be utilized in example embodiments, such as FreedomPop and NetZero (each of which provides a fixed amount of free Internet data usage per month. Alternatively, satellite Internet service providers may set up wholesale plans with 3G/4G cellular service providers, from which bandwidth may be provided to satellite Internet subscribers for respective LLN data paths, in accordance with embodiments of the present invention. In this manner, for relatively low costs (limited LLN bandwidth per satellite service subscriber) satellite service providers can significantly improve service performance, in accordance with embodiments of the present invention.

Moreover, according to one embodiment, the application-aware network multihoming approach may be employed via a middlebox implementation, deploying a middlebox at each of the client and server ends of a communications network links/paths. By way of example, each middlebox comprises two network connections, an LFN network connection (e.g., a satellite network connection) and a terrestrial network connection (e.g., a 3G/4G cellular network connection). The middleboxes split and merge flows for end users (e.g., client web browsers and web servers) using a practical multipath tunneling protocol, in accordance with example embodiments (described in further detail below). The middlebox approach thereby operates utilizing current network (e.g., Internet) protocols and infrastructure without requiring any modification of IP headers and TCP/UDP headers, and would be compatible with current broadband satellite networks (e.g., satellite networks employing TCP and TCP PEP protocols). Moreover, the applications software at the client and server nodes (e.g., web browsers and web server programs) would not require modification for compatibility with the deployed middleboxes. Further, through the middlebox approach, the user/subscriber may be provided the capability to control the data usage of the low latency network and of the LFN (e.g., in order to control costs). For example, to avoid extra billing for exceeding data caps of a respective network, users/subscribers can control the data usage between the low latency and the LFN network paths (e.g., the system may provide a user with the capability to configure a data allowance for each network). Additionally, while reducing latency through use of the low latency network paths for certain messaging, the high-bandwidth LFNs can be exploited for cost-effective delivery of other, less delay sensitive, messaging. In accordance with example embodiments, application-aware message classification thereby facilitates efficient utilization of the low latency network paths in order to provide enhanced network services.

In accordance with example embodiments, to enhance HTTPS performance, a flow is delivered through multiple networks by splitting the flow. The multiple networks, however, may be managed by different service providers, and thus the same flow through different networks will have different source IP addresses and port numbers. When the TCP handshake is performed through one path (e.g., a terrestrial network), subsequent packets of the same flow through the other path (e.g., a satellite network) will be dropped at a web server because the TCP connection for the path does not exist at the server (because of the different IP addresses and port numbers). Accordingly, embodiments of the present invention provide mechanisms and a protocols to handle such multipath TCP flows.

As specified above, multi-path transmission control protocol (MPTCP) was developed for a single TCP stream to be delivered across multiple paths. MPTCP has the benefit of reliability and higher throughput by sending TCP packets through different paths. MPTCP, however, requires a new TCP option, and thus it presents a deployment issue where middleboxes are not configured to handle a new option or rewrite the TCP options. Moreover, in satellite networks, this new TCP option does not work with TCP PEP, which terminates a TCP connection between a user satellite terminal (e.g., a very small aperture terminal or VSAT) and the satellite gateway. In addition, MPTCP requires that clients and web servers need to have MPTCP stack. Furthermore, the lack of message classification in MPTCP does not allow the system to control data usage of networks, so this causes the extra billing for the data usage of terrestrial networks. For example, the sender might deliver large files such as images and video files through the terrestrial network.

Figure 2A:
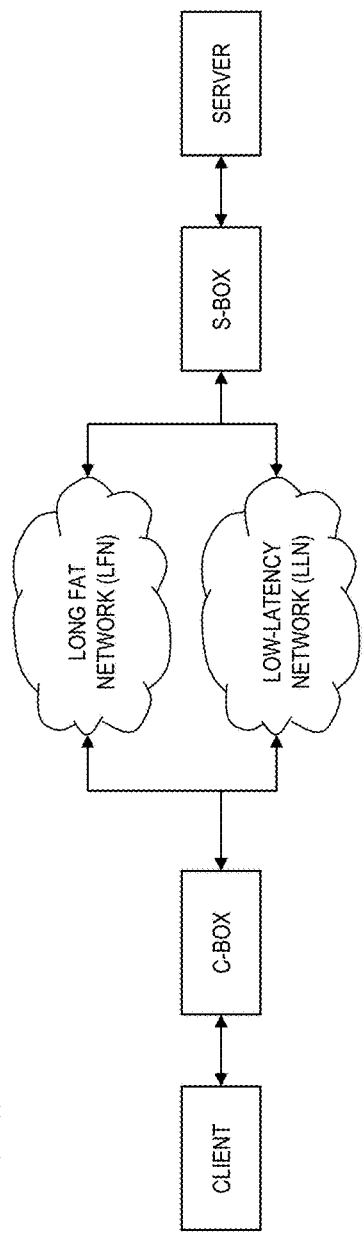
FIG. 2A illustrates a block diagram depicting a system employing application aware multihoming with multipath tunneling protocols utilizing a middlebox approach, where a client middlebox is deployed at a client network endpoint and a server middlebox is deployed at a server network endpoint, in accordance with example embodiments of the present invention.
Figure 2B:
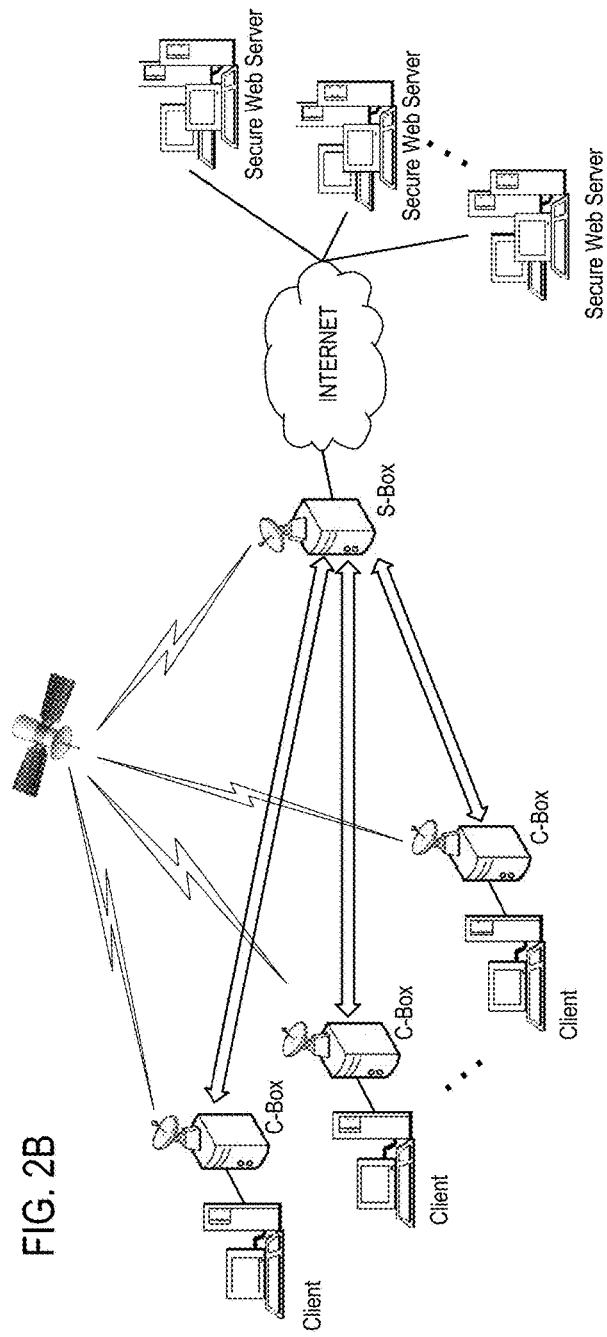
FIG. 2B illustrates a diagram depicting a satellite system employing application aware multihoming with multipath tunneling protocols utilizing a middlebox approach, where a client middlebox is deployed at each client network endpoint and a server middlebox is deployed at an entry-point to an Internet connection to multiple server network endpoints, in accordance with example embodiments of the present invention.

FIG. 2A illustrates a block diagram depicting a system employing application aware multihoming with multipath tunneling protocols utilizing a middlebox approach, where a client middlebox is deployed at a client network endpoint and a server middlebox is deployed at a server network endpoint, in accordance with example embodiments of the present invention. FIG. 2B illustrates a diagram depicting a satellite system employing application aware multihoming with multipath tunneling protocols utilizing a middlebox approach, where a client middlebox is deployed at each client network endpoint and a server middlebox is deployed at an entry-point to an Internet connection to multiple server network endpoints, in accordance with example embodiments of the present invention. With reference to FIGS. 2A and 2B, a client middlebox (C-box), which has multiple network connections, is deployed at each client (remote) site between the client terminal(s) and the LLN and LFN connections. Correspondingly, a server middlebox (S-box) is deployed at the server site (e.g., at an Internet portal as shown in FIG. 2B), between the LLN and LFN connections and the target server(s). As further illustrated in FIG. 2B, the S-Box may be deployed at an entry-point to an Internet connection to one or more target servers (e.g., the depicted secure web servers, such as web servers or application servers). The C-box and the S-box are the split-and-merge points of the respective TCP flows. In the return direction, from the remote client end to the server end of the network, the C-box determines the inroute packets of a flow or session that will be transmitted over the LLN link and the inroute packets that will be transmitted over the LFN. In the forward or outroute direction, from the gateway/server end to the remote client end of the network, the S-box determines the outroute packets of a flow or session that will be transmitted over the LLN link and the outroute packets that will be transmitted over the LFN. The middleboxes handle multiple paths of the same flow, so clients and servers do not need to extend their protocols and applications to support multihoming.

Registration:

During an initialization phase (e.g., at power-on), according to an example embodiment, a C-box registers its multiple IP addresses to a respective S-box—the C-box will have an IP address assigned for each of its network interfaces. Based on the registered IP addresses, the S-box can deliver packets to the C-box through the multiple LFN and LLN paths. By way of example, the registration process employs explicit signaling messages for the registration using a specific preconfigured port number of the S-box—that way, based on the port number, the S-box knows that the signaling messages are for multihoming control messaging, such as registration. Registration request messages, which include an identifier of the C-box (e.g., a terminal ID) and network link, may be delivered through a multihomed network. The terminal ID can be assigned by satellite Internet service providers in advance or the C-box can simply use the MAC address of the respective satellite network modem. By way of further example, the respective S-box with which a C-box registers may be configured by the network service provider via a particular IP address of the S-box or via a domain name assigned to the S-box, which translates to the respective IP address via a DNS lookup process.

Figure 3:
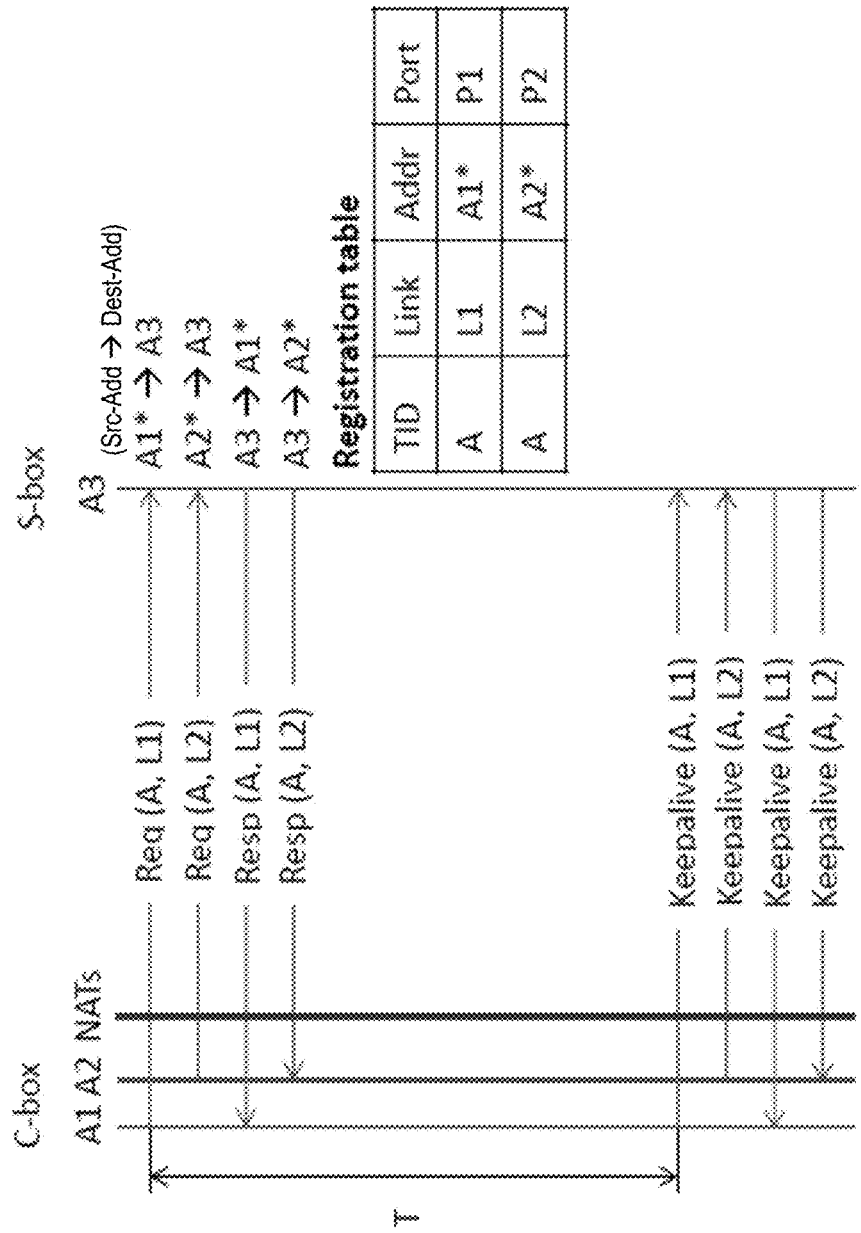
FIG. 3 illustrates a diagram depicting a Client-box registration process, in accordance with example embodiments of the present invention.

FIG. 3 illustrates a diagram depicting a Client-box registration process, in accordance with example embodiments of the present invention. The When the S-box receives the registration request message, it records the terminal ID, the source IP address of the network, and port number. In the case where the C-box is behind a network address translation function of a service provider, the S-box receives the public IP addresses of the C-box as the source addresses. Network address translation (NAT) is a methodology of remapping one IP address space (e.g., a private IP address space of a corporate network) to another IP address space (e.g., the public IP address space of the Internet) by modifying the network address information of the IP packet or datagram packet headers before being transmitted from the NAT routing device. The S-box stores the registration information in a routing table, and sends a registration response message to the C-box to confirm the registration. According to one aspect, the registration process may be a soft-state approach, wherein keep-alive messages are periodically transmitted.

With reference to FIG. 3, the C-box has two network interfaces with respective private IP addresses A1 and A2, for interfacing with two different network links L1 and L2 (e.g., an LLN and an LFN). By way of example, the network link L1 may be an LLN administered by one service provider and the network link L2 may be an LFN administered by the same or a different service provider. The IP address A1 is assigned to the C-box as the private IP address for the link L1, and the IP address A2 is assigned to the C-box as the private IP address for the link L2. Further, via the NAT function, A1* and A2* are the respective public IP addresses assigned to the private IP addresses A1 and A2 of the C-box. The terminal ID (TID) of the C-box is A—the TID identifies the specific C-box with which the IP addresses are associated (the S-box can distinguish between the different C-boxes associated to that S-box). The Registration table shows the stored registration or routing information at the S-box. Periodically, based on the time period T, the C-box sends keep-alive messages to the S-box, and the S-box sends respective keep-alive responses back to the C-box. Accordingly, as depicted, the C-Box sends the two registration requests to the IP address of the S-Box (A3). The request, Req (A, L1), is for registration of its private IP address A1 as the source address for inroute packet transmissions from the C-box, and the destination address for outroute packet transmissions from the S-box, over the network link L1. The request, and Req (A, L2), is for registration of its private IP address A2 as the source address for inroute packet transmissions from the C-box, and the destination address for outroute packet transmissions from the S-box, over the network link L2. The S-box, based on the NAT, receives the two requests with the respective source addresses being the public IP address A1* (associated through the NAT to the private address A1) and the public IP address A2* (associated through the NAT to the private address A2). Consequently, the S-box registers the public IP address A1* as the address for packets to be transmitted to the C-box with the TID=A over the link L1, and registers the public IP address A2* as the address for packets to be transmitted to the C-box with the TID=A over the link L2. The S-box also stores the respective C-box source ports in the table.

A further example of such a Registration Table is shown below in Table 1. The entries of Table 1 reflect two different C-boxes communicating with a single S-box (C-box A and C-box B). Each C-box communicates with the S-box via two different network links (e.g., an LLN link 1 and an LFN link 2). The public IP address for the C-box A over the LLN link 1 is 67.44.192.130, the public IP address for the C-box A over the LFN link 2 is 70.192.217.80, the public IP address for the C-box B over the LLN link 1 is 67.44.20.115, and the public IP address for the C-box B over the LFN link 2 is 70.192.115.85. The source Client port for the for the C-box A over the LLN link 1 is 574, the source Client port for the C-box A over the LFN link 2 is 293, the source Client port for the C-box B over the LLN link 1 is 1938, and the source Client port for the C-box B over the LFN link 2 is 332. This data is collected and stored by the S-box via the C-box registration processes discussed above.

TABLE 1

Registration Table

| C-Box TID | Link | C-Box IP Address (IP Address of C-box for respective Link) | C-box Port # (Generated by C-box) |
| --- | --- | --- | --- |
| A | 1 | 67.44.192.130 | 574 |
| A | 2 | 70.192.217.80 | 293 |
| B | 1 | 67.44.20.115 | 1938 |
| B | 2 | 70.192.115.85 | 332 |
| ... | ... | ... | ... |

According to a further aspect, the registration process may be an asynchronous approach, so the C-box or S-box updates the registration in the event of a network status change. By way of example, when one of the networks is down, the C-box may send a signaling message to terminate the multihoming through the other network. By way of further example, if a user exceeds an applicable data allowance of one of the networks (e.g., exceeds a subscription data allowance of the LLN), the S-box may send a signaling message to terminate the multihoming. Further, in addition to registering the respective C-box information, the registration process may also open the connections between the C-box and S-box, which are used to deliver packets between the C-box and S-box. Thus, registration messages may be delivered over the same transportation protocol (TCP or UDP) as the multipath tunneling (described in further detail below).

Multipath Tunneling:

In accordance with example embodiments, to deliver messages between a C-box and an S-box through multiple paths, a multipath tunneling mechanism is provided. With such an approach, because the same flow is delivered over paths of different networks, the original TCP header cannot be used. More specifically, since some packets are delivered through one network and the others are delivered through the other network, utilization of the original TCP headers would result in sequence number and ACK number holes at the end nodes of each path. The holes consequently would result in packet drops when middleboxes such as TCP PEP manage the TCP states. To resolve such sequence and ACK numbering issues, example embodiments provide for encapsulation of the original TCP header and payload into a new transport layer (TCP or UDP), based on the TID, link and IP address associations created during the registration process. Thus, the original TCP header and TCP payload becomes the payload of the new encapsulated transport layer packet. After the packet is delivered to the destination end, the middlebox at that end uses the original TCP header for the end-host (the destination client terminal(s) at the client end or the destination server at the server end). Thus, the end-to-end TCP connection between a source client and destination server is preserved. Accordingly, the encapsulation or multipath tunneling is used for the delivery of packets through multiple paths between middleboxes, and the original TCP encapsulation is preserved over links beyond the middleboxes, which allows the system to work on the current Internet infrastructure and to work with other middleboxes that manage TCP states.

Figure 4A:
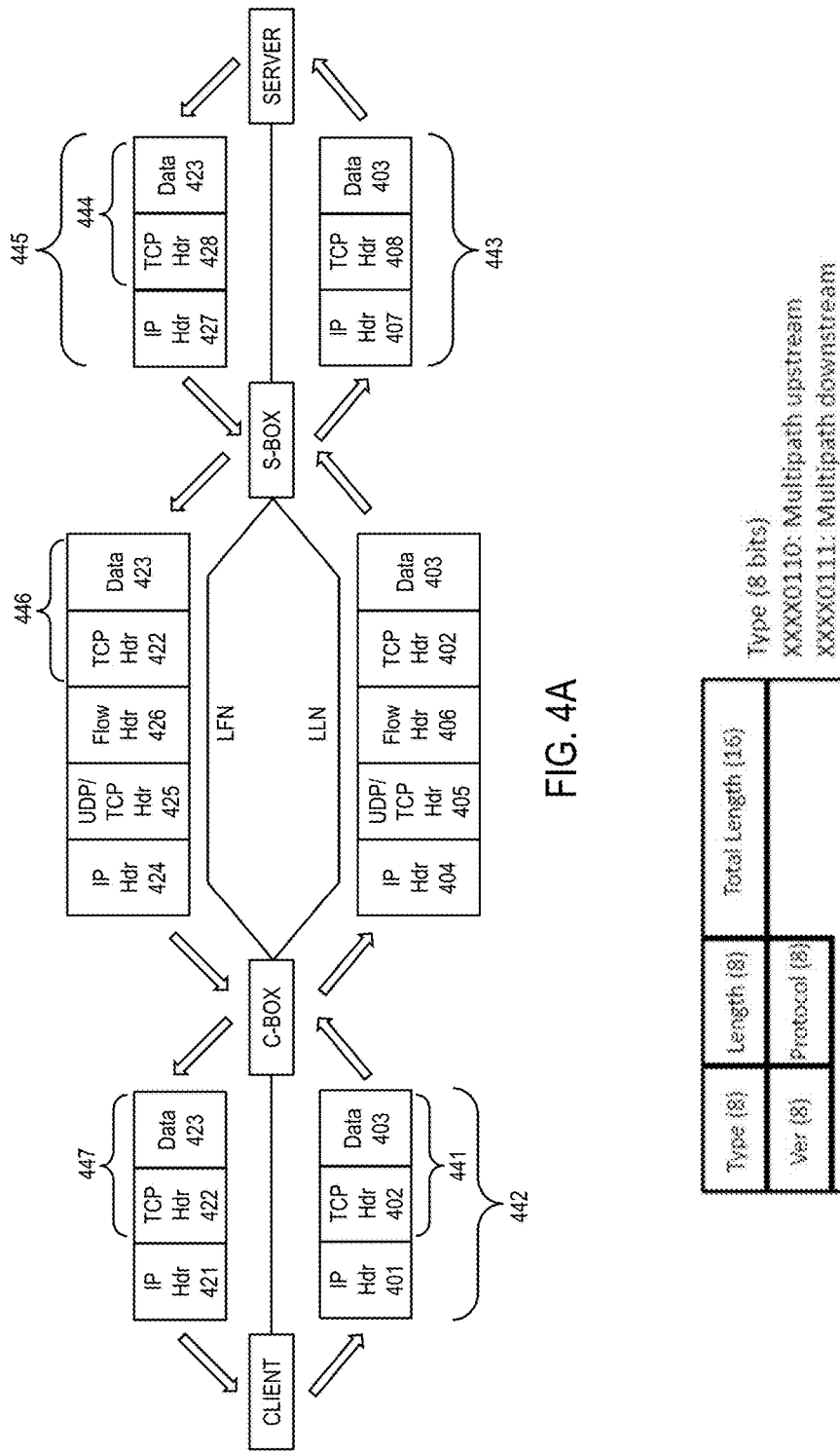
FIG. 4A illustrates a block diagram depicting multipath tunneling approaches, in accordance with example embodiments of the present invention.

In accordance with example embodiments, two multipath transport layer tunneling methods are described herein, UDP multipath tunneling and TCP multipath tunneling. FIG. 4A illustrates a block diagram depicting multipath tunneling approaches, in accordance with example embodiments of the present invention. Such multipath tunneling approaches do not split SSL sessions—they do not decrypt SSL packets at the man-in-the-middle, so that the system preserves the end-to-end security. Further, in accordance with example embodiments, the UDP and TCP multipath tunneling employed between the C-box and the S-box are respectively employed independently over each network link based on the standard User Datagram Protocol processes and Transmission Control Protocol processes. In other words, the processing for the packet flow over each link (such as connection setup, sequencing, acknowledgments, transmission confirmations, etc.) is performed in accordance with the applicable protocol standard. The middleboxes thereby communicate with each other over each network link via a respective UDP or TCP connection, using the standard UDP or TCP stack. Accordingly, the packets received over a given network link by the destination middlebox are processed as a single flow over that link, in accordance with the applicable protocol. Then, once the protocol is stripped by the destination middlebox, and the original packet is acquired, the packets from the multiple links are reassembled and transmitted on to the ultimate destination(s) based on the original source flow information obtained from the original packet headers.

According to the first transport layer tunneling embodiment, UDP multipath tunneling is employed, whereby the original TCP packets are delivered within UDP datagram packets (TCP-over-UDP). Because UDP tunneling uses a simple connectionless transmission model, UDP multipath tunneling does not require the management of different sessions for the different network links (e.g., the LLN link and the LFN link). Instead, the original TCP packets are encapsulated and transmitted as UDP datagrams by the source middlebox, and the destination middlebox strips the UDP encapsulation to recover the original TCP packets. With UDP, the source middlebox send the messages to the destination middlebox without prior setup of specific sessions or channels. The reliability, flow control, and congestion control are provided by the end-to-end (client-to-server) original TCP packets encapsulated within the UDP. With UDP multipath tunneling in a network employing TCP PEP (e.g., a satellite network), however, the UDP tunneling cannot use the benefit of the TCP PEP, because UDP packets typically bypass the TCP PEP of such networks.

According to the second transport layer tunneling embodiment, TCP multipath tunneling is employed, whereby the original TCP packets are encapsulated within TCP data packets (TCP-over-TCP). By contrast to UDP multipath tunneling, TCP multipath tunneling can receive the benefit of TCP PEP. By way of example, to employ TCP PEP, each middlebox is configured with a PEP-like functionality, which would split a TCP connection to three connections: one connection between a client and C-box, another connection between the C-box and respective S-box, and the other connection between the S-box and a destination server. In this scenario, the middleboxes would generate local acknowledgments to the respective end hosts to fill up the link between middleboxes and support reliability between an end host and a middlebox. Reliability between the C-box and S-box is provided by the TCP connections between the middleboxes.

Figure 4B:
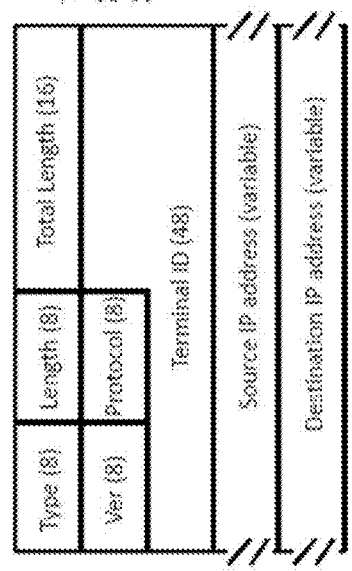
FIG. 4B illustrates a flow header format for a type-length-value (TLV) object format, in accordance with an example embodiment of the present invention.

Since flows are delivered through one connection of each network created during the registration process, flows are multiplexed over each connection. Thus, separate flows are multiplexed together over each network link between middleboxes. To facilitate the identification of the respective flow to which each packet belongs (e.g., demultiplex the flows over each network link), flow information is inserted in each of the packets to identify the respective original flow. For example, in addition to the new transport layer header, a flow header (e.g., C-box terminal ID (TID) and flow information) is inserted in the packets transmitted between the C-box and the S-box. More specifically, according to one embodiment, the flow header includes the C-box TID, the IP address of the respective source client, the IP address of the destination server, the source port of the source client, and the destination port of the destination server. According to a further embodiment, the source and destination port numbers are not included in the flow header, as those port numbers will already be included in the original TCP header (which remains in the encapsulated packet). FIG. 4B illustrates a flow header format for a type-length-value (TLV) object format, in accordance with an example embodiment of the present invention. In this flow header, "Type" is the packet type (e.g., multipath upstream or multipath downstream), "Length" is the header length, "Total Length" is the length of the packet (e.g., used to identify each packet when packets are multiplexed in the same connection), "Ver" is the IP address version (e.g., IPv4 or IPv6), "Protocol" is the packet encapsulation protocol (e.g., UDP or TCP), "Terminal ID" is the C-box ID, "Source IP Address" is the private IP address of the source Client, and "Destination IP Address" is the IP address of the destination server. The header may optionally include a "Source Port" field identifying the port number of the source Client, and a "Destination Port" identifying the destination port number of the destination Server. The source IP address and port number are used to identify flows for clients who share the same C-box, while terminal ID is used to identify the C-box. The destination IP address and the destination port number are the end server IP address and port number (e.g., 443 for SSL/TLS).

With reference to FIG. 4A, for example, an original TCP packet 441 (containing the TCP header 402 and data 403) is transmitted by the Client to the C-box, via a local IP network, as the IP packet 442. Based on the Internet Protocol (IP) specifications, the IP header 401 includes a source IP address (the IP address of the source Client) and a destination IP address (the IP address of the destination Server). Based on the Transmission Control Protocol (TCP) specifications, the TCP header 402 includes a source port (the respective port of the source Client) and a destination port (the destination port of the destination Server). The packet 441, for example, may be an HTTP Get message requesting a specific web-page from the Server. The C-box, based on the applied message classification approach, determines that the short HTTP Get message should be transmitted to the S-box via the LLN link. The C-box receives the packet and strips the IP header 401. The C-box then encapsulates the packet 441 by adding the flow information header 406, the UDP/TCP header 405 (in the case of UDP multipath tunneling, the header 405 consists of a UDP header, and, in the case of TCP multipath tunneling, the header 405 consists of a TCP header) and the IP header 404. According to one embodiment, the flow header information includes the C-box TID, the source Client IP address (from the IP header 401), and the destination Server IP address (also from the IP header 401). As mentioned above, according a further embodiment, the flow header may also include the source Client port number and the destination Server destination port number (obtained from the TCP header 402). The UDP/TCP header 405 includes the requisite UDP or TCP information for the respective flow connection over the LLN to the S-box. Finally, the IP header 404 includes the source IP address for the packet (the IP address of the source C-box associated with the LLN link) and the destination IP address (the IP address of the destination S-box).

When the S-box receives the packet it records certain flow information from the various headers in a Flow Information Table, which is utilized to match responsive packets received from the destination end-points (e.g., servers) to the respective flows, and to generate the appropriate encapsulation headers for transmission back to the respective C-boxes and ultimately back to the respective Clients (as described in further detail below). The S-box also strips the Flow header 406, the UDP/TCP header 405 and the IP header 404 from the received packet. The S-box then re-encapsulates the packet TCP header 408 and data 403 as a new IP packet 443 destined for the destination Server and respective port number. The IP header 407 for this new IP packet 443 includes a source IP address (the IP address of the source S-box) and a destination IP address (the IP address of the destination Server—obtained from the flow header 406). In other words, when the S-box receives a packet, it records the flow information of the packet to the Flow Information Table, restores the destination (e.g., web server) IP address to the original address, and changes the source IP address to its IP address (e.g., acting as a proxy). Further, for the TCP header 408, the S-box generates an output port number (i.e., a unique source port number for the respective source Client flow) and records the output port in the Flow Information Table for the respective Client flow. The S-box inserts the output port number in the TCP header 408 as the source port which is used to deliver the flow to the Server. In this manner, based on the flow header and other header information of each packet received from a C-box over the different network links, the S-box can determine and record (in the Flow Information Table) a particular original source flow from which the packet originated (i.e., data packets originating from a source flow from a common source client IP address, via a common C-box, to a common destination server IP address).

The server would then process the received message (e.g., an HTTP Get message), and return the respective response data (e.g., data of the website requested by the Get message). As would be recognized, the request and response messaging between the Client and the Server may be of various different types without departing from the scope of the present invention. For example, an application may be running on the Client terminal that operates through a remote application server (e.g., an interactive on-line gaming application, or a remotely hosted office productivity application), whereby the client terminal may be transmitting application data to the application server, or may be other types of interactive request messages soliciting certain data responses from the application server. Back to the example of an HTTP Get request, the Server will process the request and initiate a flow back to the Client for the requested website data. Each data packet will first be formatted as a TCP packet 444 including the data 423 and the TCP header 428. The TCP header 428 will include a source port number (the respective port of the Server) and a destination port number (the output port number of the S-box provided via the TCP header 408). The Server will encapsulate the TCP packet 444 as an IP packet 445. The IP header 427 will include a source IP address (the IP address of the Server) and a destination IP address (the IP address of the S-box). Further, as the destination Server receives the packets of a particular source flow (regardless of the particular network link between the respective C-box and S-box over which each packet was transmitted), the Server can reassemble the flow based on the TCP header 408.

When the S-box receives a packet from the Server, in accordance with example embodiments, the S-box will make an application-aware classification determination to determine the appropriate network link for transmission of the packet back to the C-box (similar to the determination made by the C-box to determine the appropriate network link for transmission of the request packet to the S-box). In this case, because the data packet contains a web response to an HTTP Get request, the S-box may determine that the LFN is the appropriate network link. Further, the S-box will need to determine the particular flow to which the packet belongs. According to one embodiment, this determination is made based on the Flow Information Table compiled by the S-box. An example of such a Flow Information Table is provided below in Table 2. The Flow information Table includes a record (row) for each original source Client data flow. With reference to Table 2, two such source data flow records are shown. The first record reflects a flow transmitted via the C-box TID A, from the original (e.g., private) IP address of the respective source Client (192.168.10.2) to the destination IP address of the respective destination Server (23.202.245.155)—e.g., obtained by the S-box from the flow header 406 (which originated, at least in part, from the IP header 401). The other flow information recorded for this data flow is a source port number of the respective source Client (4928) and the destination port of the destination Server (443)—e.g., obtained by S-box from the TCP header 402. Additionally, the flow information recorded in the table for this flow also includes an output port (2931) (which is a source port number generated by S-box, and provided to the destination Server as the source port in the TCP header 408), and a protocol identifier (6) (which identifies the protocol type—e.g., UDP or TCP). Similarly, the second record reflects a flow transmitted via the C-box TID B, from the original (private) IP address of the respective source Client (192.168.20.5) to the destination IP address of the respective destination Server (171.161.203.100); and reflects a source port number of the respective source Client (2718), the destination port of the destination Server (443), the S-box output port (2932), and the protocol identifier (6).

TABLE 2

Flow Information Table

| C-Box TID | Source IP | Destination IP | Source Port | Destination Port | Protocol | Output Port |
|---|---|---|---|---|---|---|
| A | 192.168.10.2 | 23.202.245.155 | 4928 | 443 | 6 | 2931 |
| B | 192.168.20.5 | 171.161.203.100 | 2718 | 443 | 6 | 2932 |
| ... | ... | ... | ... | ... | ... | ... |

When the S-box receives the packet, it obtains the S-box output port information for the respective flow from the TCP header 428, and uses that port identifier to access the respective flow information from the Flow Information Table. For example, if the S-box output port is 2931, then the S-box determines that the packet belongs to a flow transmitted via the C-box TID A, from the IP address and port of the source Client (address 192.168.10.2 and port 4928) to the IP address and destination port of the destination Server (address 23.202.245.155 and port 443), and using the protocol identified protocol type between the C-box and S-box. Also, based on the C-box TID determined from the respective Flow Information Table record, and the network link over which the S-box intends to transmit the packet, the S-box obtains the respective IP address (e.g., public IP address) of the respective C-box for that link from the Registration Table. Based on this information, the S-box encapsulates the TCP packet 446 for transmission to the C-box via the LFN. For the TCP header 422, the S-box inserts the source and destination port numbers of the Server and the source Client. For the flow header 426, the S-box inserts the source IP address and the destination IP address obtained from the respective record of the Flow Information Table, so the C-box can determine the specific Client flow to which the packet belongs. The S-box encapsulates the flow header 426/TCP header 422/Data 423 as a UDP or TCP packet (depending on the determined protocol type) to utilize the appropriate protocol connection between the S-box and C-box over the respective network link. Further, the S-box encapsulates that packet as an IP packet, with the IP header 424 including the S-box IP address as the source address and the C-box IP address (e.g., public IP address) for the respective network link as the destination address.

When the C-box receives the packet from the S-box, it strips the flow header 426, the UDP/TCP header 425 and the IP header 424 from the packet to recover the TCP packet 447. Further, the C-box recovers the IP address and port number of the original source Client, and recovers the IP address and destination port number of the destination Server, from the flow header 426 information. The C-box then encapsulates the TCP packet 447 as an IP packet, with the IP header 421 including the Server IP address as the source address and the Client IP address as the destination address—e.g., as if the packet had come directly from the Server. With regard to the TCP header 422, as assembled by the S-box, the header includes the source and destination port numbers of the Server and the source Client—e.g., also as if the packet had come directly from the Server. Further, as the respective C-box receives the packets of a particular source flow (regardless of the particular network link between the respective C-box and S-box over which each packet was transmitted), the C-box can reassemble the flow based on the TCP header 422.

Further, because new headers (UDP/TCP header and flow information) are inserted in packets, a maximum transmission unit (MTU) issue may be encountered. For example, if the original packet size is the MTU of the path, the packet will be dropped when the new additional headers are inserted (as the packet will exceed the MTU size for the path). To overcome such MTU issues, in accordance with example embodiments, the maximum segment size (MSS) value of the respective TCP SYN and SYN-ACK packets is changed. By way of example, when a TCP SYN packet arrives at the C-box, and a TCP SYN-ACK packet arrives at the S-box, for respective TCP connections, each middlebox will modify the MSS option to accommodate for the additional header information. For example, if the original MSS value is 1460, then the new MSS value becomes 1460–Lh, where Lh reflects the length of the additional headers. Accordingly, when negotiating the TCP MSS/MTU parameters with the Client and the Server, the C-box and the S-box (the C-box with respect to the Client and the S-box with respect to the Server) will negotiate the segment size to leave room for addition of the respective headers. In that context, for example, the C-box and S-box negotiate end-to-end TCP connection parameters.

Message Classification:

As introduced above, according to example embodiments, message classification is applied to identify types of data messages in order to route interactive, small messages through a LLN path (e.g., a relatively low latency network path) and deliver large messages through an LFN path (e.g., a geosynchronous satellite network path). By way of example, TCP handshake messages and SSL/TLS session setup messages are generally small messages compared to HTTPS response messages, but they are interactive. Thus, they may be delivered over an LLN path via the middleboxes, which significantly decreases connection time while minimizing data consumption over the LLN path. Further, HTTPS request messages from clients are generally small size messages and fit into one TCP packet, but the delivery of these messages suffer from higher delay than response messages because of BoD processing of upstream traffic (as discussed above). By way of further example, therefore, HTTPS request messages may also be delivered over an LLN path via the middleboxes. As a further example, a user may upload large size files using SSL/TLS (e.g., for cloud storage services, using SSL/TLS (TCP port number 443) to upload and download files for security and privacy). The delivery of such SSL/TLS traffic (e.g., secure uploading of pictures and video files for cloud storage) through the LLN path, however, would result in large LLN bandwidth usage for a non-delay-sensitive application. To resolve this issue, by way of further example, the system/middlebox may limit the amount of uploaded data per flow. Then, when the amount of data being uploaded exceeds the limit, the further packets of the flow would be delivered through an LFN path.

On the other hand, HTTPS response messages are generally much larger than request messages. Further, the HTTPS response messages are encrypted, so it is not possible to identify the size of the message or the message type (e.g., image files, video files, small text files, etc.). Even though SSL/TLS records provide the size of SSL/TLS messages, when an application message is chunked into multiple messages (segmented at the SSL/TLS level), it is hard and impractical to try and determine the actual application message size. Further, splitting a response message to deliver it through an LFN path and an LLN path would not be effective or practical in terms of download time, because the end-host (e.g., the client and C-box) still has to wait until it receives the complete response message. In accordance with example embodiments, therefore, HTTPS response messages may be delivered over LFN paths. Moreover, example embodiments of the present invention would be applicable to further classification rules/guidelines (e.g., as may be readily determined for different communications protocols).

Figure 5A:
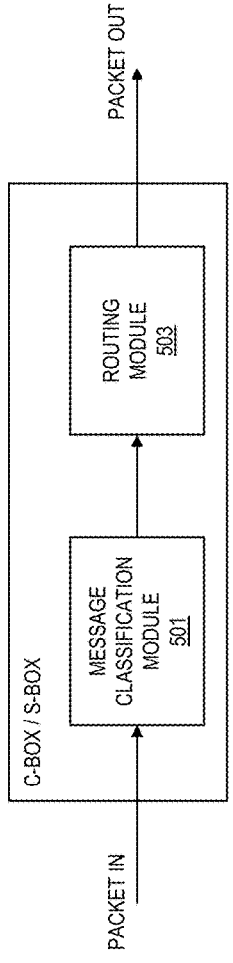
FIGS. 5A and 5B illustrate block diagrams depicting an architecture for a multiple matching table classification approach, in accordance with example embodiments of the present invention.
Figure 5B:
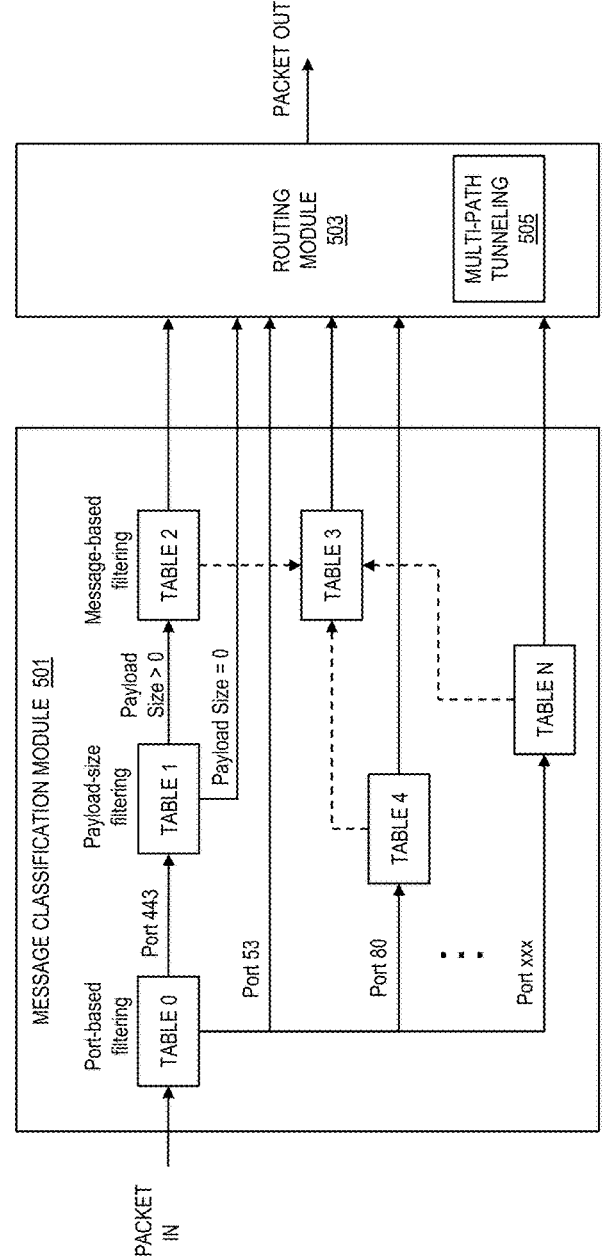

In accordance with example embodiments, to classify different messages, a filtering or matching table approach may be employed. FIGS. 5A and 5B illustrate block diagrams depicting an architecture for a multiple matching table classification approach, in accordance with example embodiments of the present invention. When a packet arrives at the middlebox, the packet passes stages of matching tables. Then, based on the packet-marking at each stage, the packet is forwarded to the proper network interfaces for encapsulation and transmission over the respective network link. With reference to FIG. 5A, in accordance with example embodiments, the message classification mechanism within each middlebox (C-box and S-box) will comprise a message classification module 501 and a routing module 503.

By way of example, with reference to FIG. 5B, the first stage classification may be based on a port-based matching table (Table 0), which classifies message packets based on the destination port number. At such a first stage, message packets can be classified based on well-known port numbers that are associated with certain applications and/or message types. Such well-known port-based classifications may include DNS lookup messages (UDP port number 53), HTTP messages (TCP port number 80), OCSP messages (TCP port number 80), SSL/TLS messages (TCP port number 443), and others. After the first stage, each packet may be passed on to a second classification stage that utilizes a particular classification approach depending on the outcome of the port-based classification for the packet. By way of further example, because HTTP messages and OCSP messages both generally use the same TCP port number (80), the packets that include port 80 as the destination port of the TCP header may be delivered to a the second classification stage that utilizes a particular destination IP address filtering table (Table 4). The Table 4 classification, for example, may include a list of OCSP Server IP addresses that differentiates OCSP messages from HTTP messages based on the IP address matching an address in the OCSP Server address list of Table 4. Further, such an OSCP Server IP address table can be generated based on the IP addresses returned during the DNS lookup phase for respective OCSP server names. As a result of this second stage, the port 80 messages having a matching OCSP IP address would then be marked for transmission via the LLN link interface (e.g., terrestrial network interface) of the C-box or S-box.

By way of further example, because packets addressed to port 53 are classified as DNS lookup messages, the respective packets can be marked for transmission via the LLN link without applying any further classification stages.

By way of further example, after the port-based classification, TCP packets with port 443 may be passed on to a second classification stage that filters TCP packets based on payload size (Table 1). At this stage, the port 443 SSL/TLS message packets can be filtered to differentiate between TCP handshake/control packets and data packets based on the packet payload size. For example, when payload-size indicates that the whole message is included in one packet (e.g., payload-size=0), then that packet is determined to be a set-up or control message, and may thus be marked for delivery via the LLN link.

Alternatively, for larger port 443 message packets, by way of further example, to classify such SSL/TLS messages by type, a message-based classification may be applied. When the message size is larger than the MTU, the message is segmented to multiple TCP packets. The first segmented packet carries the SSL/TLS record header, but the following segmented packets do not carry the SSL/TLS records. Thus, traditional packet-based classification cannot know whether the following segmented packets are SSL/TLS session setup messages or SSL/TLS application data messages. In accordance with one embodiment, therefore, a stateful classification method is applied (Table 2), using payload-based classification to handle segmented messages. By way of example, two fields of TLS record header may be used: content type and length. The content type field of the TLS record header indicates whether the TLS messages are session setup messages or application data messages—so, based on this indicator, the packets of the respective message can be marked for transmission via the appropriate network link (e.g., based on whether the message is a session setup message or an application data message). The length field of the TLS record header indicates whether the message is segmented and how many segmented packets make up the message. When the message is received, the length field of the TLS record header is obtained, and when the length field specifies that the message is larger than the packet size, it is determined that the message is segmented over multiple packets. The flow information for the message is recorded (as described above), as is the remaining message size. Subsequently, when each packet of the segmented message is received, the remaining message size is updated, and when all the segmented message packets are received (e.g., the remaining message size becomes zero), the stored information for that message may be deleted.

In accordance with further message classification embodiments, a further classification stage may be applied based on subscription level or other limits on link capacity for a particular network link. By way of example, a flow-cap filtering stage may be applied based on a customer subscription capacity limit (Table 3) for aggregate customer traffic utilizing that network link (e.g., the LLN link may have a periodic maximum capacity limit for a particular Client based on the Client subscription level). Accordingly, the Table 3 filtering may track when the Client traffic reaches a capacity limit for the respective link, and then filter message packets from data flows of that Client and route them via the LFN link (irrespective of any message classification applied by earlier stages) to avoid exceeding the respective capacity limit. Accordingly, any individual prior stage may be routed through the Table 3 classification stage (as indicated by the dashed paths of FIG. 5B through the Table 3). This filtering is to prevent a high volume of data from uploading through an LLN path with a limited data allowance. If the flow exceeds the data limit of flow, packets in the flow will be delivered through the network with a high data allowance (e.g., the LFN path).

As would be appreciated, various additional classification stages, or combinations of further classification stages may be applied to the ports depicted in FIG. 5B, or to additional ports (Port xxx through Table N), based on further routing rules and known ports associated with further application/ message types, without departing from the scope and concepts of embodiments of the present invention. Further, once the message classification process is completed, the message data packets are forwarded to the routing module 503, wherein the multipath tunneling is applied and the packets are provided to the appropriate network interface of the respective middlebox.

Figure 6:
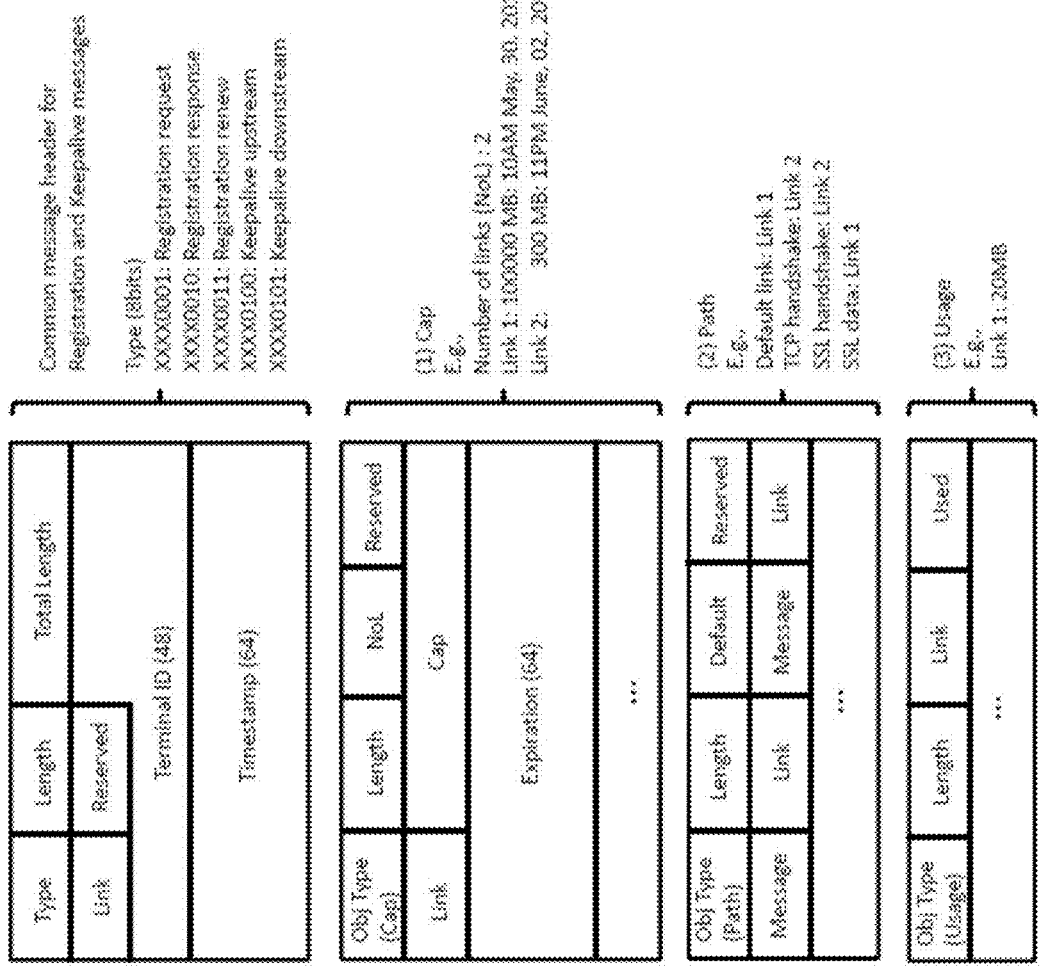
FIG. 6 illustrates a message format for user-defined traffic control, in accordance with an example embodiment of the present invention.

User Defined Traffic Control:

In accordance with example embodiments, each user/subscriber may have different data allowance requirements for the auxiliary LLN network paths (e.g., a terrestrial cellular data network), such as via different terrestrial Internet services and data plans. Accordingly, such embodiments provide for user-defined traffic control, whereby a user can configure a custom data plan and traffic path preference profile on a middlebox (e.g., during the registration process). By way of example, the system may employ registration messages to relay respective user profiles to the S-box and provide for periodic keep alive messages to periodically update and monitor data usage at the C-box and S-box. By way of further example, a user may configure a particular path preference by message types and data cap for of each link, and configure this profile within the respective C-box. Once configured, registration messages relay the profile information to the S-box, and the S-box stores the user profile and utilizes it in determining the appropriate paths for respective messages. Further, a C-box might consume data usage without passing through the S-box. For example, DNS lookup and OCSP messages may be directly delivered to the servers through a terrestrial network. Thus, the C-box may be configured to periodically update the S-box for the respective available data cap for each link. To achieve this, keep-alive messages may carry a usage object, which indicates data usage that did not pass through the S-box in order for the S-box to maintain an accurate data usage with respect to the applicable cap. FIG. 6 illustrates a message format for user-defined traffic control, in accordance with an example embodiment of the present invention. According to the format depicted in FIG. 6, registration messages carry flow header, limit or cap object and path object, and keep-alive messages carry flow header and usage object.

By way of further example, based on the user profile, the C-box controls the upstream traffic and the S-box controls the downstream traffic. If the data usage of an LLN (e.g., terrestrial network) reaches the allowed data plan, the C-box and S-box thereafter deliver traffic through LFN paths (e.g., satellite network paths). This user-defined traffic control allows users to avoid the extra cost for the use of this system.

By way of further example, the C-box may insert a timestamp into registration request and keep-alive upstream messages, and the S-box may send back the timestamp in registration response and keep-alive downstream messages, so that the C-box can periodically monitor the delay of respective networks. The measured delay may then be used to periodically determine relative path delays. As such, if a situation arises where a LLN path presents a higher delay relative to the LFN paths (e.g., because of link congestion or other performance issues), the system can then fall back to the LFN paths for all traffic until the situation is resolved or an alternate LLN path becomes available.

Deployment:

In satellite network systems, according to one embodiment, S-boxes are located at satellite gateway sites, because all satellite traffic goes through the gateway. According to further embodiments, however, there is no limitation on S-box locations. Accordingly, in view of the many potential deployment locations for an S-box, according to a further example embodiment, a C-box can be configured with a mechanism or process for locating the most appropriate S-box at any given point in time—such as each time the C-box reboots. Further, one such mechanism for locating a respective S-box may be by DNS lookup. Alternatively, the S-box assignment to a given C-box may, for example, be based on the S-box deployment of a respective network service provider, and may be implemented via a boot-up protocol provided to the C-box by the provider.

With regard to S-box scalability, S-boxes may exhibit dynamic scalability issues, because it handles flows between C-boxes and web servers. For example, during busy and peak time, an S-box requires more computational processing power, whereas, during non-peak time, the S-box may require less processing power. According to further example embodiments, such a dynamic scalability issue can be mitigated by using cloud computing, which may employ the dynamic launch of VM instances and load balancing mechanisms among S-boxes.

Further, as such system middlebox approaches can be deployed for example embodiments via a cloud computing system, software defined network (SDN) technologies and approaches may be employed to manage network services. Without SDN, when there is network reconfiguration/re-provisioning and there are user-profile changes, network administrators have to manually handle the changes. An SDN approach, however, allows network administrators to easily manage the changes, using the central controller of the SDN. Thus, this SDN approach allows the system to lower the management cost and quickly manage the dynamic changes of network and user profiles. Further, the SDN approach could be configured to employ approaches whereby matching flows would be delivered to the appropriate respective middleboxes.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, by a client-proxy device serving one or more client devices, a first client data packet of a client data flow originating from a client application of a one client device of the client devices served by the client-proxy device, wherein the first client data packet comprises a client data payload and a client header structure configured based on one or more data communications protocols employed by the client application for transmission of the first client data packet over a wide-area data communications network to a destination server device;
determining a message classification for the first client data packet based on one or more application-based parameters associated with the client application;
selecting a first proxy data flow of a plurality of proxy data flows of a split multipath tunnel for transmission of the first client data packet to a server-proxy device serving one or more server devices including the destination server device, wherein each of the proxy data flows of the split multipath tunnel provides a data transmission path over a respective network link between the client-proxy device and the server-proxy device, and wherein the selection of the first proxy data flow is based on the determined message classification of the first client data packet;
modifying the client header structure of the first client data packet to generate a client-proxy data packet comprising the original client header and client data payload as a data payload of the client-proxy data packet, and a client-proxy header structure, wherein the client-proxy header structure comprises (i) flow information regarding the client data flow including an address parameter of the one client device and an address parameter of the destination server device, and a sequence parameter indicating a sequencing of the first client data packet within the client data flow, (ii) an identifier of the client-proxy device, and (iii) flow information regarding the selected first proxy data flow including an address parameter of the client-proxy device and an address parameter of the server-proxy device and a sequence parameter indicating a sequencing of the client-proxy data packet within the selected first proxy data flow;
transmitting the client-proxy data packet to the server-proxy device via the first proxy data flow;
receiving, by the server-proxy device, the client-proxy data packet;
recording a client flow record in a flow information table for the client data flow, wherein the client flow record includes the address parameter of the one client device and the address parameter of the destination server device, the client-proxy device identifier, and a server-proxy device source identifier specific to the flow record;
modifying the client-proxy header structure of the client-proxy data packet to generate a second client data packet comprising the client data payload and a client-server header structure, wherein the client-server header structure comprises the address parameter of the destination server device, the address parameter of the server-proxy device, the sequence parameter indicating the sequencing of the first client data packet within the client data flow, and the server-proxy device source identifier; and
transmitting the second client data packet to the destination server device.

2. The method according to claim 1, further comprising:
receiving, by the server-proxy device, a first server data packet of a server data flow originating from a server application of the destination server device, wherein the first server data packet comprises a server data payload that relates to the first client data packet and a server header structure based on the one or more data communications protocols employed by the client application, wherein the server header structure includes the server-proxy device source identifier;

determining a message classification for the first server data packet based on one or more application-based parameters associated with the server application;

selecting a second proxy data flow of the plurality of proxy data flows of the split multipath tunnel for transmission of the first server data packet to the client-proxy device, wherein the selection of the second proxy data flow is based on the determined message classification of the first server data packet, and wherein the second proxy data flow may be the same proxy data flow as the first proxy data flow;

acquiring the client flow record from the flow information table by looking up the record based on the server-proxy device source identifier included in the server header structure of the first server data packet;

modifying the server header structure of the first server data packet to generate a server-proxy data packet comprising the server data payload and a server-proxy header structure, wherein the server-proxy header structure comprises (i) flow information regarding the server data flow including the address parameter of the one client device and the address parameter of the destination server device acquired from the client flow record, and a sequence parameter indicating a sequencing of the first server data packet within the server data flow, and (ii) flow information regarding the selected second proxy data flow including the address parameter of the server-proxy device and the address parameter of the client-proxy device and a sequence parameter indicating a sequencing of the server-proxy data packet within the selected second proxy data flow;

transmitting the server-proxy data packet to the client-proxy device via the second proxy data flow.

3. The method according to claim 2, further comprising:

receiving, by the client-proxy device, the server-proxy data packet;

modifying the server-proxy header structure of the server-proxy data packet to generate a second server data packet comprising the server data payload and a server-client header structure, wherein the server-client header structure comprises the address parameter of the destination server device and the address parameter of the one client device, and the sequence parameter indicating a sequencing of the first server data packet within the server data flow; and transmitting the second server data packet to the source-client device.

4. A data communications system comprising:

a client-proxy device and a plurality of client devices, wherein the client-proxy device serves the plurality of client devices; and a server-proxy device and one or more server devices including a destination server device, wherein the server-proxy device serves the one or more server devices; and wherein the client-proxy device comprises a receiver configured to receive a first client data packet of a client data flow originating from a client application of a one client device of the plurality of client devices, wherein the first client data packet comprises a client data payload and a client header structure configured based on one or more data communications protocols employed by the client application for transmission of the first client data packet over a wide-area data communications network to the destination server device, wherein the client-proxy device further comprises a processor configured to determine a message classification for the first client data packet based on one or more application-based parameters associated with the client application, wherein the client-proxy device further comprises a transmitter, wherein the processor of the client-proxy device is further configured to select a first proxy data flow of a plurality of proxy data flows of a split multipath tunnel for transmission of the first client data packet to the server-proxy device, wherein each of the proxy data flows of the split multipath tunnel provides a data transmission path over a respective network link between the client-proxy device and the server-proxy device, and wherein the selection of the first proxy data flow is based on the determined message classification of the first client data packet, wherein the processor of the client-proxy device is further configured to modify the client header structure of the first client data packet to generate a client-proxy data packet comprising the original client header and client data payload as a data payload of the client-proxy data packet, and a client-proxy header structure, wherein the client-proxy header structure comprises (i) flow information regarding the client data flow including an address parameter of the one client device and an address parameter of the destination server device, and a sequence parameter indicating a sequencing of the first client data packet within the client data flow, and (iii) flow information regarding the selected first proxy data flow including an address parameter of the client-proxy device and an address parameter of the server-proxy device and a sequence parameter indicating a sequencing of the client-proxy data packet within the selected first proxy data flow, wherein the transmitter of the client-proxy device is configured to transmit the client-proxy data packet to the server-proxy device via the first proxy data flow, wherein the server-proxy device comprises a receiver configured to receive the client-proxy data packet, wherein the server-proxy device further comprises a processor configured to record a client flow record in a flow information table for the client data flow, wherein the client flow record includes the address parameter of the one client device and the address parameter of the destination server device, the client-proxy device identifier, and a server-proxy device source identifier specific to the flow record, wherein the processor of the server-proxy device is further configured to modify the client-proxy header structure of the client-proxy data packet to generate a second client data packet comprising the client data payload and a client-server header structure, wherein the client-server header structure comprises the address parameter of the destination server device, the address parameter of the server-proxy device, the sequence parameter indicating the sequencing of the first client data packet within the client data flow, and the server-proxy device source identifier, and wherein the server-proxy device further comprises a transmitter configured to transmit the second client data packet to the destination server device.

5. The data communications system according to claim 4:

wherein the receiver of the server-proxy device is further configured to receive a first server data packet of a server data flow originating from a server application of the destination server device, wherein the first server data packet comprises a server data payload that relates to the first client data packet and a server header structure based on the one or more data communications protocols employed by the client application, wherein the server header structure includes the server-proxy device source identifier;

wherein the processor of the server-proxy device is further configured to determine a message classification for the first server data packet based on one or more application-based parameters associated with the server application;

wherein the processor of the server-proxy device is further configured to select a second proxy data flow of the plurality of proxy data flows of the split multipath tunnel for transmission of the first server data packet to the client-proxy device, wherein the selection of the second proxy data flow is based on the determined message classification of the first server data packet, and wherein the second proxy data flow may be the same proxy data flow as the first proxy data flow;

wherein the processor of the server-proxy device is further configured to acquire the client flow record from the flow information table by looking up the record based on the server-proxy device source identifier included in the server header structure of the first server data packet;

wherein the processor of the server-proxy device is further configured to modify the server header structure of the first server data packet to generate a server-proxy data packet comprising the server data payload and a server-proxy header structure, wherein the server-proxy header structure comprises (i) flow information regarding the server data flow including the address parameter of the one client device and the address parameter of the destination server device acquired from the client flow record, and a sequence parameter indicating a sequencing of the first server data packet within the server data flow, and (ii) flow information regarding the selected second proxy data flow including the address parameter of the server-proxy device and the address parameter of the client-proxy device and a sequence parameter indicating a sequencing of the server-proxy data packet within the selected second proxy data flow; and wherein the transmitter of the server-proxy device is further configured to transmit the server-proxy data packet to the client-proxy device via the second proxy data flow.

6. The data communications system according to claim 5:

wherein the receiver of the client-proxy device is further configured to receive the server-proxy data packet;

wherein the processor of the client-proxy device is further configured to modify the server-proxy header structure of the server-proxy data packet to generate a second server data packet comprising the server data payload and a server-client header structure, wherein the server-client header structure comprises the address parameter of the destination server device and the address parameter of the one client device, and the sequence parameter indicating a sequencing of the first server data packet within the server data flow; and wherein the transmitter of the client-proxy device is further configured to transmit the second server data packet to the source-client device.

* * * * *